Patented May 28, 1940

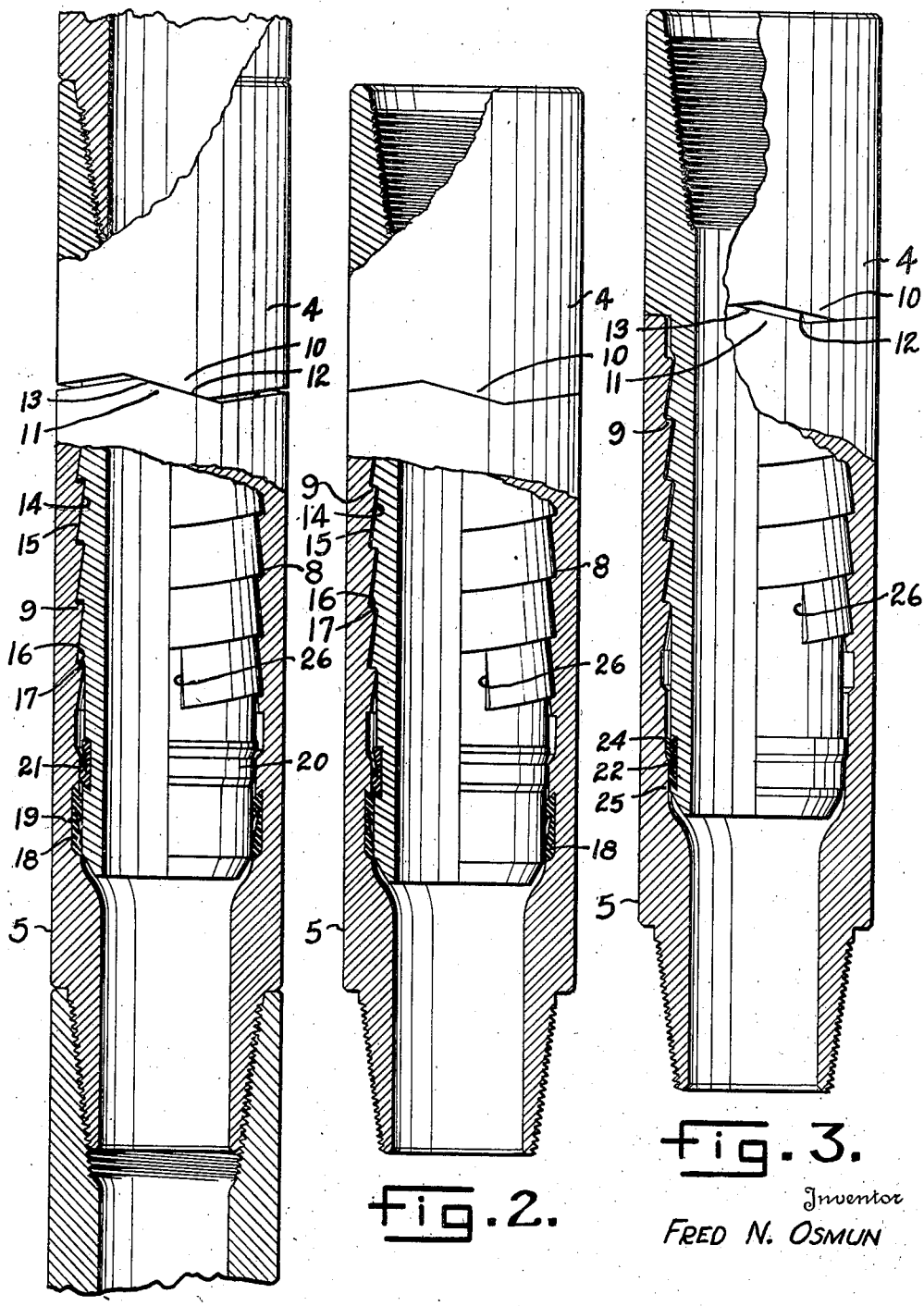

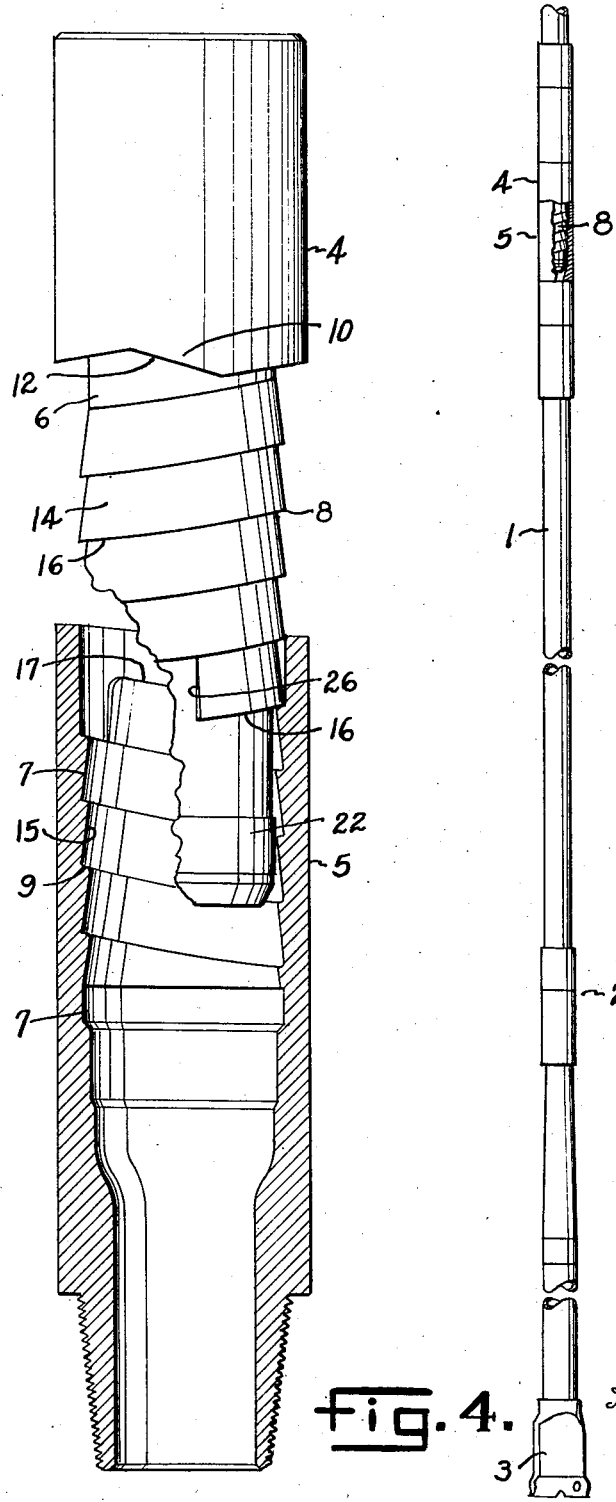

2,202,260

UNITED STATES PATENT OFFICE 2,202,260

SAFETY JOINT

Fred N. Osmun, Houston, Tex.

Application August 28, 1939, Serial No. 292,279

9 Claims. (Cl. 255—28)

This invention relates to a safety joint.

An object of the invention is to provide a safety joint adapted to be incorporated into a tubular string of pipe such as a drill stem which is used in rotary well drilling and by the use of which the stem may be readily parted at the selected place for removal in case of necessity. This application is a continuation, in part, of my copending application, Serial No. 160,453, filed August 23, 1937.

The ordinary drill stem used in rotary well drilling is made up of a number of sections connected together by threads. This stem is used for driving the drill at the lower end thereof. Sometimes the drill becomes stuck in the bore and cannot be withdrawn and in such event it is desirable to unscrew, withdraw and save the drill stem. The safety joint herein described may be located in the stem at any desired point, preferably adjacent the drill so that in case the drill becomes stuck the stem may be parted at the safety joint and withdrawn and thus recovered.

It is one of the principal objects of this invention to provide a safety joint which is not liable to become unscrewed during ordinary drilling operations but which may be broken by the column stress of the string in case of necessity, and then readily unscrewed when it is desired to separate the drill stem and withdraw it.

In carrying on well drilling operations it becomes necessary at times to manipulate the stem in the bore, that is, to move it up and down or vibrate it while elevating or lowering it and while the drill is off of bottom. In carrying on these operations the safety joint may become broken, as that term is hereinafter used, but not completely separated. The present invention embodies novel connecting means between the sections of the safety joint or such formation that the vertical movements of the stem up and down and the vibration thereof, under the conditions above pointed out, will not be liable to cause the connected parts to completely unscrew and permit complete separation of them but on the other hand will have a tendency to cause said parts to screw together.

It is a further object of the invention to provide a safety joint of the character described whose parts or sections are connected by a novel type of threads of such construction that they will have a maximum amount of useful bearing surfaces.

With the above and other objects in view the invention has particular relation to certain novel features of construction, operation and arrangement of parts, an example of which is given in this specification and illustrated in the accompanying drawings, wherein—

Figure 1 shows a side elevation, partly in section, of the safety joint showing the joint members screwed fully home and under torsional strain.

Figure 2 shows a similar view illustrating the joint as broken.

Figure 3 shows a side view, partly in section, showing the joint members partially unscrewed and equipped with a single, two way packer.

Figure 4 shows a side elevation, partly in section, showing the joint members brought into position to be screwed together and also illustrating the novel type of threads employed, and Figure 5 shows a drill stem illustrating the safety joint incorporated therein.

Referring now more particularly to the drawings wherein like numerals of reference designate the same parts in each of the figures, the numeral 1 designates a driving member such as a drill stem used for rotary well drilling. As is well known the drill stem is made up of sections connected by tool joints such as 2 whose joint members are screwed together. The drill stem is driven by means of a rotary drilling machine at the ground surface and drives the drill 3 attached to the lower end thereof.

The type of safety joint herein described is preferably incorporated into the drill stem near the lower end thereof. It embodies a pin member 4 attached to an upper section of the drill stem and a box member 5 which is connected, preferably by threads to the section of the drill stem beneath. The pin member has a reduced pin which is threaded into the box 7 of the box member 5. The inter-connecting threads embody spiralled scrolls or threads 8, 9 the former of which are formed on the pin and the latter of which are formed in the box.

The scroll-like threads 8 fit nicely in the corresponding threads 9 when the parts are screwed together.

As clearly illustrated in Figures 1 to 3, inclusive, the pin and box members also have the cams 10, 11 which are formed with opposing cam faces 12 and 13, respectively. These faces are pitched reversely with respect to the pitch of the corresponding threads and are arranged to abut when the pin is screwed home into the box and upon the application of additional torsional strain the face 12 will ride upon the face 13 with wedge-like effect thus placing the connected parts under tension.

It will be noted that the threads 8, 9 have the corresponding pitched spiralled faces 14, 15, pitched at an acute angle to the longitudinal axis of the joint and these pitched faces terminate at spiralled shoulders 16, 17. These shoulders are at approximately right angles to the axis of the joint, as more clearly shown in Figures 1 to 4. When the pin is being screwed into the box as shown in Figure 4 the shoulder 16 will ride upon the opposing shoulder 17 and there will be a minimum of frictional contact between the faces 14, 15. However, when the cam face 12 co-acts with the cam face 13 and the joint is subjected to additional torsional strain in the same direction said faces will ride upon each other with wedge-like effect as hereinabove stated and the faces 14 will be drawn into close frictional contact with the opposing faces 15 and there will be a clearance between the opposing shoulders 16, 17 as illustrated in Figure 1. In other words when the pin is screwed home into the box, upon further relative rotation of the pin and box the cam faces will cause a relative endwise movement of the connected parts to effect locking of the parts with a minimum of rotative movement.

With the drill on bottom should it be desired to break the joint the load of the stem above may be released and the column stress acting through the cam faces 12, 13 will cause a relative reverse movement of the pin 4 in the box thus breaking the joint, the parts assuming the position shown in Figure 2 with the shoulder 16 resting on the shoulder 17 and with the tapering faces 14, 15 out of contact. Upon a reverse rotation of the stem above, the pin may then be easily unscrewed from the box and the stem above withdrawn.

The drill stem, as is well known, is tubular and the safety joint is also tubular to permit the circulation of drilling fluid.

In order to prevent the gritty drilling fluid from cutting away the threads packing has been provided. As illustrated in Figures 1 and 2 there is an annular packing ring 18 countersunk into the inside wall of the box member beneath its threads. The free end of the pin member is blank and fits closely within this packing ring and said ring is provided with a downwardly directed annular lip 19 which fits closely around the blank end of the pin member. Above the packing ring 18 there is an annular packing ring 20 which surrounds and is countersunk into the pin member and which has an external upwardly directed annular lip 21 which fits closely within the blank lower end portion of the box member. A very efficient seal is thus provided between the pin and box to prevent the passage of gritty fluid in either direction which otherwise would cut out the adjacent parts.

As illustrated in Figure 3 there is a single annular packing ring 22 surrounding and countersunk into the free end of the pin member and projecting out slightly beyond the surface of the pin member. When the pin is screwed home in the box this packing ring 22 is forced into close fitting contact with the inside blank portion of the box so as to place the ring 22 under compression. The compressive force exerted against the packing ring 22 will cause the packing to be deformed into upwardly and downwardly directed external, annular lips, 24, 25 which fit closely against the inside wall of the box member, as shown in Figure 3, whereby to form a very efficient seal.

As clearly shown in Figures 1 to 4, inclusive, the external thread 8 on the pin member terminates in an abrupt shoulder 26 extending the full width of the thread. This shoulder extends approximately radially and as the thread 8 is screwed into the thread 9 this shoulder 26 will act as a scraper to remove all obstructing matter within the box in advance of it to prevent the collection of obstructing matter between the intermeshing threads.

As shown in Figure 4, the beveled end of the pin 6 enters the box 7 and aligns the members. The shoulder 16 of the first thread of the pin then seats on the shoulder 17 of the first thread of the box in positive contact due to the shape of the shoulders and due to the fact that the ends of the threads are terminated at full size. As the threads, upon insertion of the pin into the box, positively engage with each other, there is no possibility of the threads becoming crossed due to incorrect engagement of the first turns of the threads.

As heretofore indicated while the drill 3 is off of bottom in running the drill stem into or withdrawing it from the well the safety joint may become broken. Under these conditions, however, it is not liable to become completely separated. In manipulating the stem there will be sudden relative axial movement between the pin and box of the safety joint but there will be no tendency of these parts to unscrew. Normally the faces 15 of the box will be held in close fitting frictional contact with the corresponding faces 14 of the pin by the weight of the section of the stem beneath and this friction will overcome any tendency of the box to turn and unscrew from the pin. If in manipulating the stem the upper and lower sections of the stem are moved suddenly longitudinally toward each other the opposing shoulders 16 and 17 will contact suddenly and then react.

The direction of the reaction will be at right angles to the faces of the shoulders 16, 17 thus imparting relative rotation to the joint members in a direction to cause the threads to screw together rather than to unscrew. This has been found to be true in actual practice, that is, if the safety joint becomes broken or partly unscrewed, accidentally or unintentionally, a sharp vibratory movement of the drill stem in a longitudinal direction will cause the connected parts of the safety joint to screw together rather than to become further unscrewed.

The drawings and description are illustrative merely, while the broad principle of the invention will be defined by the appended claims.

What I claim is:

1. A safety joint adapted for use in a string of pipe in a well and comprising a box member connected to the string and having internal threads, a pin member connected to the string and having a pin provided with external threads adapted to mesh with the internal threads, said joint members having opposing faces pitched in a direction the reverse of the pitch of the threads and arranged to abut with a wedging action when the pin is screwed home into the box, said faces being effective to cause the joint to break in response to the stress of the weight of the string above, 2. A safety joint connected into a string of pipe in a well and comprising a box member having an internally threaded box, a pin member having an externally threaded pin adapted to be screwed into the box, said joint members having cams fixed thereon and provided with faces arranged to co-act with wedge-like effect and place the connecting parts under tension when the pin is screwed fully home into the box, said faces being pitched to cause said joint to break in response to the imposition of the weight, of the column of the string above, on the joint.

3. A safety joint comprising a box member having a box provided with internal threads, a pin member having a pin formed with external threads adapted to mesh with the internal threads, cams formed integrally with said respective members and having faces pitched reversely with respect to the pitch of the corresponding threads, said faces being arranged to co-act when the pin is screwed fully home into the box to cause relative axial movement of the joint members in opposite directions to place the connecting parts under tension and said faces being effective to cause the joint to break in response to endwise stress forcing said members toward each other.

4. A string of well pipe having a connecting joint formed of a box member having internal threads and a pin member having a pin provided with external threads in mesh with the internal threads, a cam integral with each member, said cams having faces pitched reversely with respect to the corresponding threads and arranged to co-act with wedging effect when the pin is screwed fully home into the box said faces having sufficient pitch to cause the joint to break in response to the downward stress of the load of the column of the string above.

5. A safety joint comprising a pin member and a box member having intermeshing threads provided with co-acting wedging faces, said members having abutting parts adapted to contact and effective, when the pin member is screwed to home position, to move the faces into wedging contact to lock the members against further relative rotation, said parts being shaped to cause, upon movement of the pin member towards the box member, a reverse rotation of the pin member relative to the box member to break said contact between the faces.

6. A safety joint comprising a pin member and a box member having intermeshing threads provided with co-acting locking faces, said members having abutting parts adapted to contact when the pin member is screwed into home position in the box member to force the locking faces together, said abutting parts being shaped to release said faces upon application of an end thrust on the members and to cause the joint to break.

7. A safety joint comprising a box member having a box provided with an inside spiralled face pitched at an acute angle to the longitudinal axis of the joint and terminating in a spiralled shoulder at approximately a right angle to the axis of the joint, a pin member having a pin provided with an external spiralled face pitched at an acute angle to the longitudinal axis of the joint and terminating at a spiralled shoulder at approximately right angles to the axis of the joint, said spiralled faces and shoulders forming threads adapted to intermesh, when the pin is screwed home into the box, with the shoulder of the pin facing the shoulder in the box.

8. A safety joint comprising a box member having a box provided with an inside spiralled face pitched at an acute angle to the longitudinal axis of the joint and terminating in a spiralled shoulder at approximately a right angle to the axis of the joint, a pin member having a pin provided with an external spiralled face pitched at an acute angle to the longitudinal axis of the joint and terminating at a spiralled shoulder at approximately right angles to the axis of the joint, said spiralled faces and shoulders forming threads adapted to intermesh, when the pin is screwed home into the box, with the shoulder of the pin facing the shoulder in the box, said pin and box members having cams formed integrally therewith and provided with coacting cam faces effective to cause the spiralled faces to interlock when the pin is screwed fully home into the box.

9. A safety joint comprising a box member having a box provided with an inside spiralled face pitched at an acute angle to the longitudinal axis of the joint and terminating in a spiralled shoulder at approximately a right angle to the axis of the joint, a pin member having a pin provided with an external spiralled face pitched at an acute angle to the longitudinal axis of the joint and terminating at a spiralled shoulder at approximately right angles to the axis of the joint, said spiralled faces and shoulders forming threads adapted to intermesh, when the pin is screwed home into the box, with the shoulder of the pin facing the shoulder in the box, the thread of the pin terminating, at its free end, in an abrupt shoulder extending the full width of the thread.

FRED N. OSMUN.